(12) United States Patent
Takeuchi

(10) Patent No.: US 7,229,052 B2
(45) Date of Patent: Jun. 12, 2007

(54) FIXING TOOL

(75) Inventor: Yasuichi Takeuchi, Tokyo (JP)

(73) Assignee: Takeuchi Industrial Co., Ltd., Tokyo (JP)

( * ) Notice: Subject to any disclaimer, the term of this patent is extended or adjusted under 35 U.S.C. 154(b) by 0 days.

(21) Appl. No.: 10/827,807

(22) Filed: Apr. 20, 2004

(65) Prior Publication Data
US 2005/0230570 A1    Oct. 20, 2005

(51) Int. Cl.
*F16B 15/00*    (2006.01)

(52) U.S. Cl. ............... 248/71; 248/74.3; 24/16 PB; 24/17 AP; 411/508

(58) Field of Classification Search ........... 248/71, 248/73, 74.3, 74.5, 67.5, 70, 65; 24/16 PB, 24/17 AP; 411/502, 508, 512, 908
See application file for complete search history.

(56) References Cited

U.S. PATENT DOCUMENTS

| | | | | |
|---|---|---|---|---|
| 4,143,577 A * | 3/1979 | Eberhardt | ................ | 411/548 |
| 4,669,688 A * | 6/1987 | Itoh et al. | ................ | 248/71 |
| 5,584,452 A * | 12/1996 | Koike | ................ | 248/74.3 |
| 5,601,260 A * | 2/1997 | Shinohara et al. | ........... | 248/71 |
| 5,601,261 A * | 2/1997 | Koike | ................ | 248/71 |
| 6,749,157 B2 * | 6/2004 | Takeuchi | ................ | 248/71 |
| 6,809,257 B2 * | 10/2004 | Shibuya | ................ | 174/49 |
| 2003/0213876 A1 * | 11/2003 | Takeuchi | ................ | 248/71 |
| 2004/0089770 A1 * | 5/2004 | Akizuki | ................ | 248/71 |
| 2004/0104314 A1 * | 6/2004 | Harrison et al. | ........... | 248/68.1 |
| 2004/0108421 A1 * | 6/2004 | Yuta et al. | ................ | 248/71 |
| 2004/0182973 A1 * | 9/2004 | Kawai | ................ | 248/71 |

FOREIGN PATENT DOCUMENTS

JP    9-242936    9/1997

* cited by examiner

*Primary Examiner*—A. Joseph Wujciak, III
(74) *Attorney, Agent, or Firm*—Michael Best & Friedrich LLP

(57) ABSTRACT

A fixing tool includes a holding portion and fitting portion. The holding portion allows a chassis to hold a component. The fitting portion is integrally formed with the holding portion and is to be fitted in a through hole formed in the chassis, so that the holding portion is fixed to the chassis. The fitting portion has a post, a pair of fitting pieces, a pair of disengaging pieces, and a pair of leg pieces. The post projects downward from one side of the holding portion. The fitting pieces are formed at a distal end of the post to have an arrowhead-like shape, and elastically deform outwardly in diameter so as to be fitted in the through hole. The disengaging pieces extend from distal ends of the fitting pieces along two side surfaces of the holding portion, and elastically deform the fitting pieces, when operated manually, to disengage them from the through hole. The leg pieces have proximal ends connected to part of the disengaging pieces, and distal ends that can abut against an upper surface of the chassis. The disengaging pieces have extending ends which are close to or connected to the side surfaces of the holding portion.

1 Claim, 9 Drawing Sheets

FIXING TOOL

BACKGROUND OF THE INVENTION

The present invention relates to a fixing tool used to package an electronic component, a cable, or the like on the chassis of an electronic device or the like and, more particularly, to a fixing tool that can be removed from the upper surface of the chassis easily.

When assembling an electronic device, electronic components must be attached to an assembly board such as a panel, chassis, board, or the like (which will be referred to as a chassis hereinafter), and wiring components such as cables must be extended on the board. A mounting component is used for this purpose. For example, when a plurality of cables are to be extended parallel to each other along the surface of a chassis, a cable tie which ties the plurality of cables together and attaches them on the chassis is used. FIG. 12 shows an example of a conventional cable tie. A cable tie 1C has a band portion 11 with one free end that ties a plurality of cables together, and a locking portion 12 to which the proximal end of the band portion 11 is connected and which has engaging teeth to fit with sawteeth (not shown) of the band portion 11, when the band portion 11 is inserted in the locking portion 12 from its distal end, so that removal of the band portion 11 is prevented. The band portion 11 and locking portion 12 have the same arrangements as those of the cable tie of an embodiment to be described later, and a detailed description thereof will be omitted.

The locking portion 12 has a fitting portion 30 on its lower surface. The fitting portion 30 has a pair of fitting pieces 32 overhanging like arrowheads from the two sides of its post 31 projecting downward. When the fitting pieces 32 are inserted in a through hole 3 formed in a chassis 2 from the upper surface of the chassis 2, the pair of fitting pieces 32 are reduced in diameter by their elasticity to extend through the through hole 3. After passing through the through hole 3, the fitting pieces 32 elastically restore to enlarge in diameter, so that steps 32a formed on the terminal ends of the fitting pieces 32 fit with the inner edge of the through hole 3. A pair of inverted-V-shaped leg pieces 34 which oppose the fitting pieces 32 abut against the upper surface of the chassis 2, so that the steps 32a and through hole 3 are held fitted with each other. As an example of a fixing tool that has such a fitting portion, for example, one described in Patent Reference 1 (Japanese Patent Laid-Open No. 9-242936) is available.

In recent years, in home electric appliances, OA devices, automobiles, and electronic devices as a whole, environmentally friendly products must be sold to solve environmental issues. Along with this demand, for example, a printed board or connecting wires built in an electronic device must be able to be disassembled from the chassis, panel, or the like of the electronic device. Particularly, to facilitate the disassembling operation, the printed board or wiring lines must be disassembled easily without using any tools. With the structure of the conventional fitting portion shown in FIG. 12, however, the fitting pieces 32 must be reduced in diameter by using hands or a tool, and be extracted from the through hole 3 of the chassis 2. In this case, since the fitting pieces 32 are small and difficult to hold, they are difficult to handle. Also, the fitting pieces 32 must be reduced in diameter on the lower surface side of the chassis 2, leading to poor workability.

Regarding this issue, if the fitting pieces 32 are designed and manufactured to have low elasticity, they can be reduced in diameter easily, and can be removed from the chassis 2 easily. However, the poor operability on the lower surface side of the chassis 2 cannot be improved. If the elasticity of the fitting pieces 32 is merely decreased, when an external force acts on the fitting pieces 32, the fitting pieces 32 are likely to deform easily and be reduced in diameter easily. Then, the fixing tool may drop from the chassis 2 easily.

SUMMARY OF THE INVENTION

It is an object of the present invention to provide a fixing tool which can be removed from the upper surface side of the chassis easily and will not drop from the chassis easily.

In order to achieve the above object, according to the present invention, there is provided a fixing tool comprising a holding portion which allows a chassis to hold a component, and a fitting portion which is integrally formed with the holding portion and is to be fitted in a through hole formed in the chassis to fix the holding portion to the chassis, wherein the fitting portion has a post projecting downward from one side of the holding portion, a pair of fitting pieces which are formed at a distal end of the post to have an arrowhead-like shape and elastically deform outwardly in diameter so as to be fitted in the through hole, a pair of disengaging pieces which extend from distal ends of the fitting pieces along two side surfaces of the holding portion and elastically deform the pair of fitting pieces, when operated manually, to disengage the pair of fitting pieces from the through hole, and a pair of leg pieces which have proximal ends connected to part of the disengaging pieces, and distal ends that can abut against an upper surface of the chassis, the disengaging pieces having extending ends which are close to or connected to the side surfaces of the holding portion.

DESCRIPTION OF THE PREFERRED EMBODIMENTS

Figure 1:
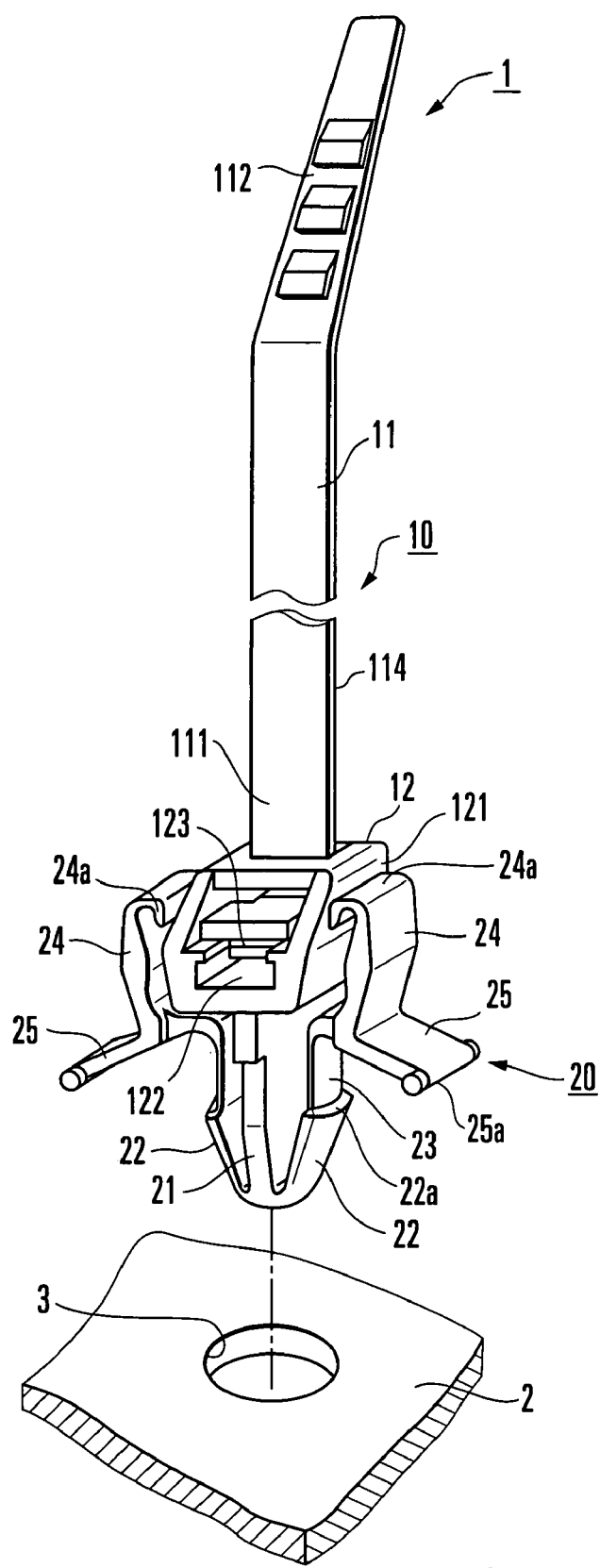
FIG. 1 is a perspective view of the first embodiment in which the present invention is applied to a cable tie.
Figures 2A, 2B:
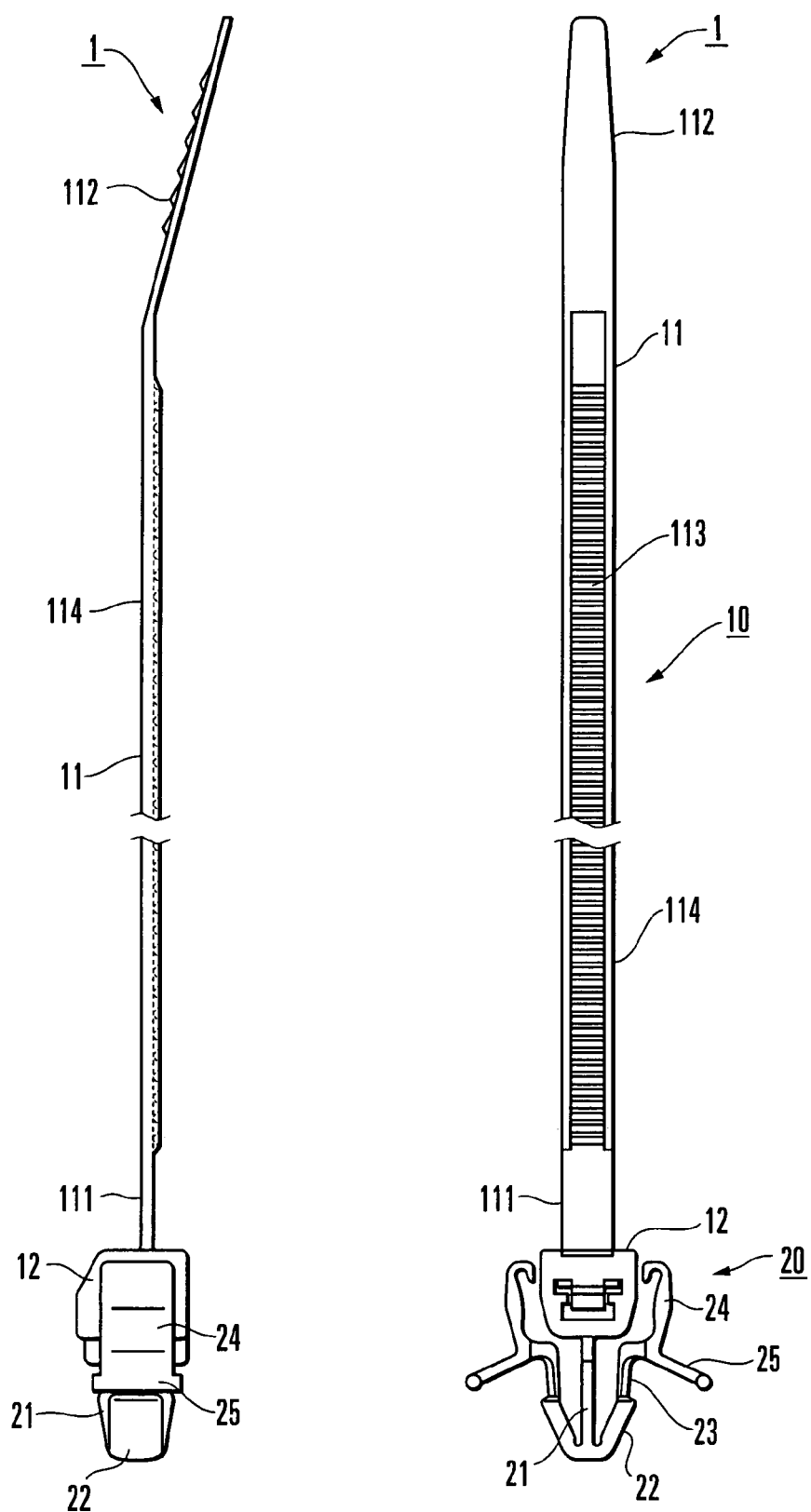
FIGS. 2A and 2B are a right side view and rear view, respectively, of the cable tie.
Figure 3A:
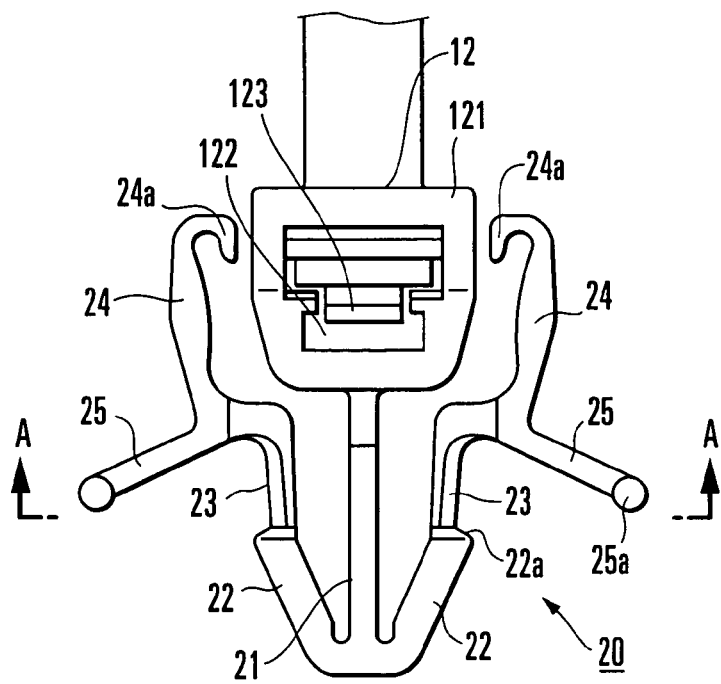
FIGS. 3A and 3B are a front view and bottom view, respectively, of the main part.
Figure 3B:
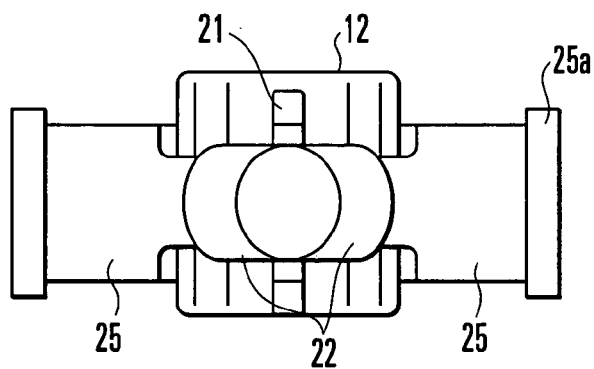
Figure 3C:
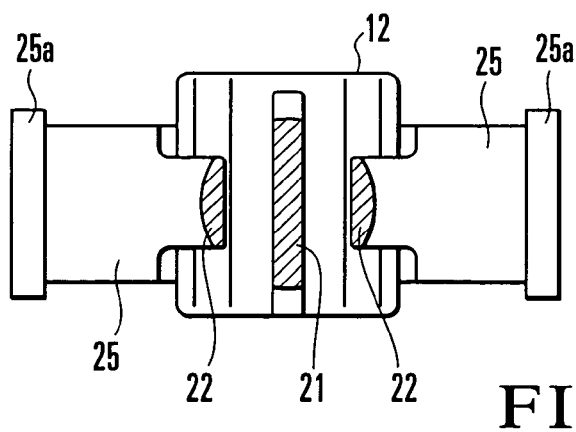
FIG. 3C is a sectional view taken along the line A—A of FIG. 3A.

The embodiments of the present invention will be described with reference to the accompanying drawings. FIG. 1 and FIGS. 2A and 2B show the first embodiment in which a fixing tool of the present invention is applied to a cable tie. FIGS. 3A and 3B show the main part, and FIG. 3C shows a section taken along the line A—A of FIG. 3A. In FIGS. 1 to 3C, a cable tie 1 of the embodiment is formed of a holding portion 10 which ties and fastens cables (not shown), and a fitting portion 20 which is to be fitted in a through hole 3 formed in a chassis 2 so that the holding portion 10 can be attached to the chassis 2. The holding portion 10 and fitting portion 20 are integrally formed by resin molding. The holding portion 10 is formed of a belt portion 11, and a locking portion 12 which locks the belt portion 11 in a state of tying and fastening the cables.

The structures of the belt portion 11 and locking portion 12 are widely known. The belt portion 11 is formed as a predetermined-width, predetermined-length belt having a proximal end 111 connected to the locking portion 12. A distal end 112 of the belt portion 11 has a gradually decreasing width so that it can be inserted in the locking portion 12 easily. One side surface of an intermediate portion 114 in the lengthwise direction of the belt portion 11 has a sawtooth portion 113 over a required region in the lengthwise direction. The locking portion 12 has a rectangular cylindrical portion 121. An insertion groove 122 through which the distal end 112 and intermediate portion 114 of the locking portion 12 can be inserted is formed in the cylindrical portion 121. A tongue-shaped locking piece 123 which can fit with the sawtooth portion 113 of the belt portion 11 is built in and supported by the insertion groove 122. Hence, when the belt portion 11 is inserted in the insertion groove 122 of the locking portion 12 from its distal end 112 while bending it around the outer surfaces of the cables (not shown), and the locking piece 123 and sawtooth portion 113 are fitted with each other, then disengagement of the belt portion 11 from the insertion groove 122 is prevented, and the cables are held tied and fastened.

The fitting portion 20 has a thin, elongated plate-like post 21 projecting downward for a required length from the lower surface of the cylindrical portion 121 of the locking portion 12. A pair of fitting pieces 22 which are elastically deformable in the direction of diameter are connected to the lower-side distal end of the post 21, so that the entire fitting portion 20 has an arrowhead-like shape. The outer side surfaces of the pair of fitting pieces 22 form an arc about the post 21 as the center, so that they form part of a circular outline. Thin connecting pieces 23 are integrally connected to the diameter-enlarged ends of the pair of fitting pieces 2. Steps 22a in the radial direction are formed on the outer surfaces of the distal ends of the fitting pieces 22 so as to correspond to the difference in thickness between the connecting pieces 23 and fitting pieces 22.

A pair of disengaging pieces 24 are connected, each to the other end of the corresponding one of the pair of connecting pieces 23, and extend upward such that they are slightly outwardly curved along the two side surfaces of the cylindrical portion 121 of the locking portion 12. Where the pair of disengaging pieces 24 are connected to the connecting pieces 23, a pair of leg pieces 25 are integrally formed to project substantially straightly such that they incline slightly downward in the two outward directions. Distal ends 25a of the pair of leg pieces 25 have rod-like shapes in order that they abut against the upper surface of the chassis 2. In a normal state, the distal ends 25a are located slightly above the steps 22a of the fitting pieces 22, to correspond to the thickness of the chassis 2. Extending ends 24a of the pair of disengaging pieces 24 are slightly thin and bent in U-shapes inwardly. The bent extending ends 24a are located to oppose the two sides of the outer surface of the cylindrical portion 121 of the locking portion 12 at small gaps.

Figure 4A:
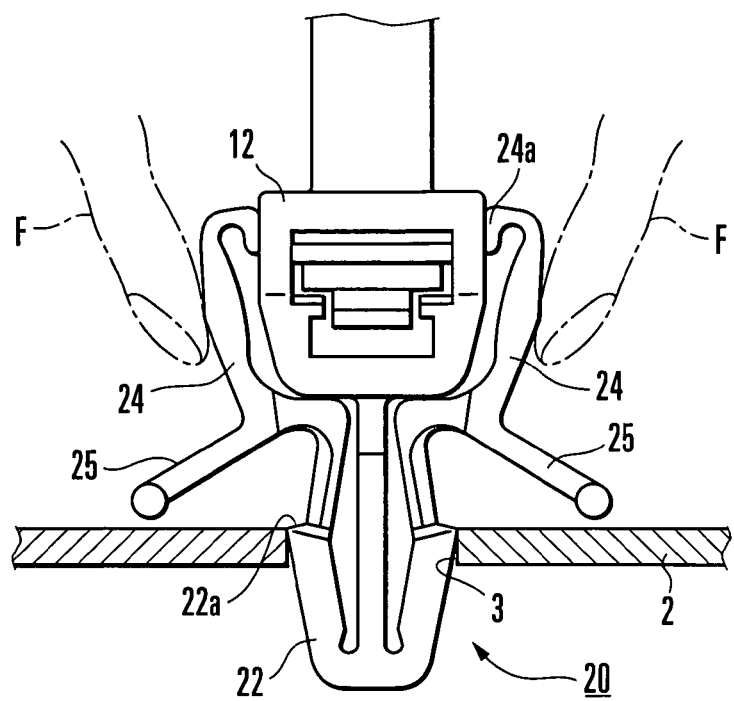
FIGS. 4A and 4B are sectional views showing a state wherein a fitting portion is being fitted in a through hole, and a state wherein the fitting portion has been fitted in the through hole, respectively.
Figure 4B:
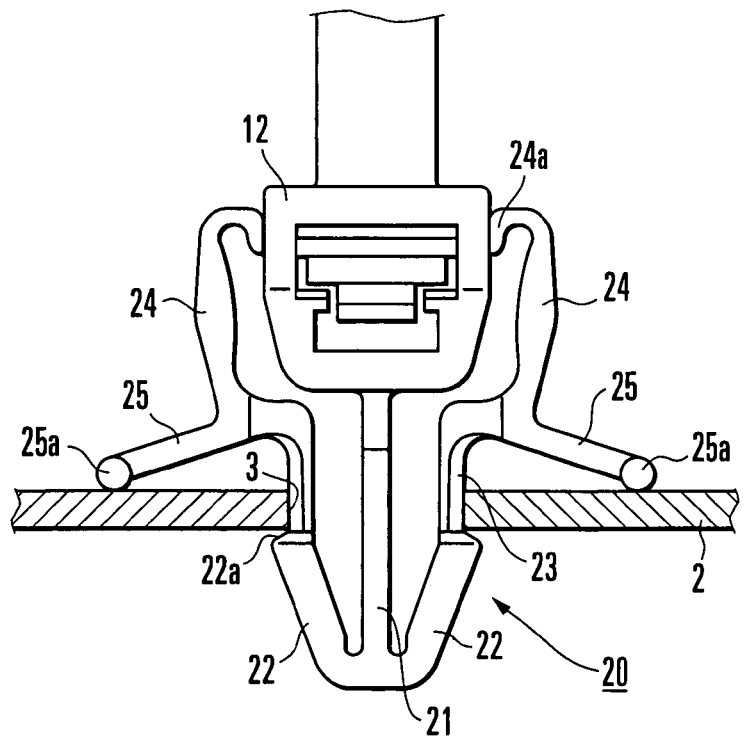

With the cable tie 1 having the above arrangement, when attaching the cable tie 1 in the through hole 3 of the chassis 2, the fitting portion 20 of the cable tie 1 is inserted in the through hole 3 from the upper surface side of the chassis 2. By this insertion, as shown in FIG. 4A, the pair of fitting pieces 22 of the fitting portion 20 are elastically deformed inwardly and are reduced in diameter, so that they can be inserted in the through hole 3. As shown in FIG. 4B, once the fitting pieces 22 extend through the through hole 3, they restore with their elasticity and enlarge in diameter outwardly, and their steps 22a engage with the inner edge of the through hole 3 on the lower surface side of the chassis 2. Simultaneously, the distal ends 25a of the pair of leg pieces 25 elastically abut against the upper surface of the chassis 2, and bias the fitting portion 20 upward. Thus, the steps 22a are pressed against the inner edge of the through hole 3, thus holding the engaging state. Even if the cable tie 1 is pulled upward, as the steps 22a and through hole 3 engage with each other, the fitting portion 20 will not disengage from the through hole 3. Thus, the cable tie 1 can be fixed to the chassis 2.

Figure 5:
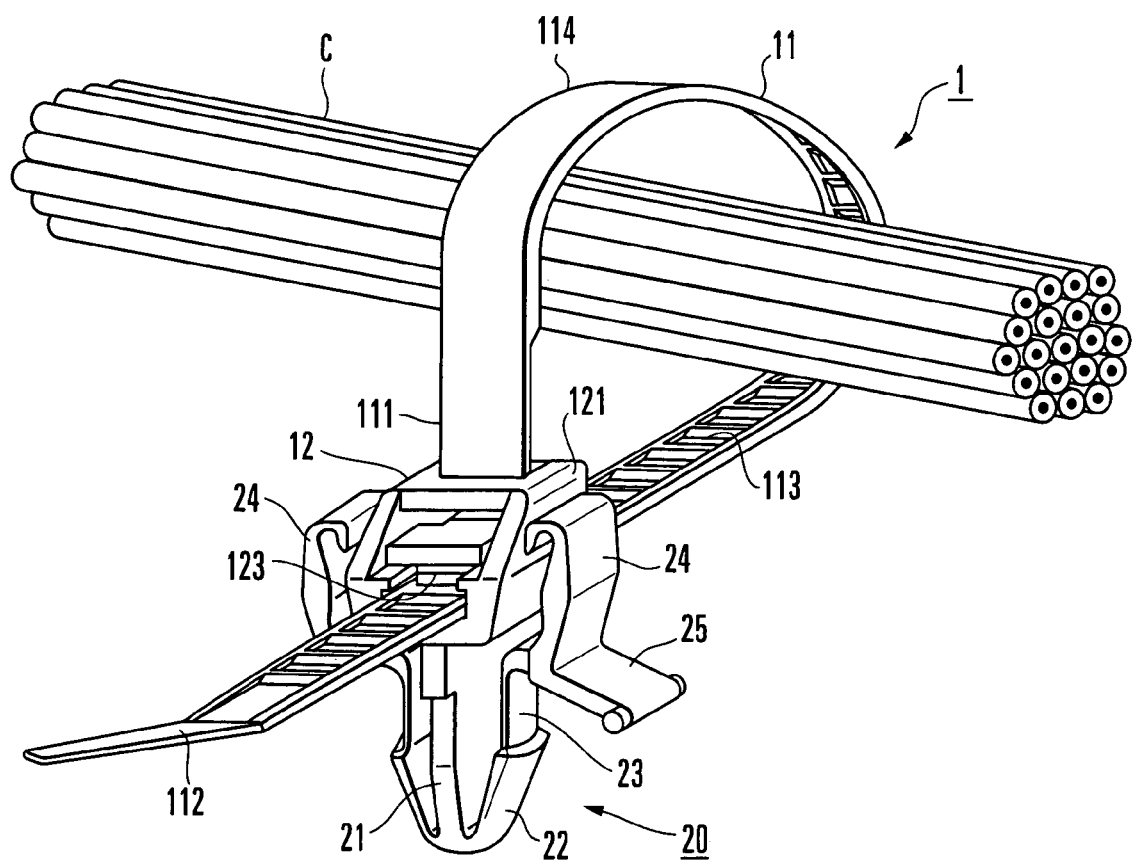
FIG. 5 is a perspective view showing a state wherein cables are held together with the cable tie.

In this state, as shown in FIG. 5, the belt portion 11 is wound around cables C which are to extend on the upper surface of the chassis 2. The distal end 112 of the belt portion 11 is inserted in the insertion groove 122 of the locking portion 12, and the locking piece 123 and sawtooth portion 113 are fitted with each other. The belt portion 11 is prevented from disengaging in a direction opposite to the inserting direction, and the state wherein the cables C are tied together and fastened is held. Therefore, the cables C are held on the upper surface of the chassis 2 by the cable tie 1. The operation of tying the cables C together and fastening them with the belt portion 11 may be performed before attaching the cable tie 1 to the chassis 2. After that, the fitting portion 20 may be inserted in the through hole 3 and fitted in it, thus attaching the cable tie 1. FIG. 5 shows this case.

In the state of FIG. 4B wherein the cable tie 1 is attached to the chassis 2, a stress is generated with which the distal ends 25a of the pair of leg pieces 25 abut against the upper surface of the chassis 2 and deform in the enlarging direction. The pair of disengaging pieces 24 deform in directions to incline inwardly, and their extending ends 24a abut against the two side surfaces of the locking portion 12 (cylindrical portion 121) slightly elastically. Thus, due to the leverage with the disengaging pieces 24 as the fulcrums, a stress is applied to the pair of fitting pieces 22 through the connecting pieces 23 to enlarge them outwardly in diameter. The fitting force of the fitting pieces 22 and through hole 3 increases. The cable tie 1 will not easily disengage from the through hole 3, and will not remove from the chassis 2 easily even with an external force or the like. If the thickness of the chassis 2 having another thickness is used, the amount of deformation of the distal ends 25a of the pair of leg pieces 25 changes. Hence, even if the chassis 2 having another thickness is used, the chassis 2 is clamped by the fitting pieces 22 in the direction of thickness, so that the fitting state is ensured.

Figure 6:
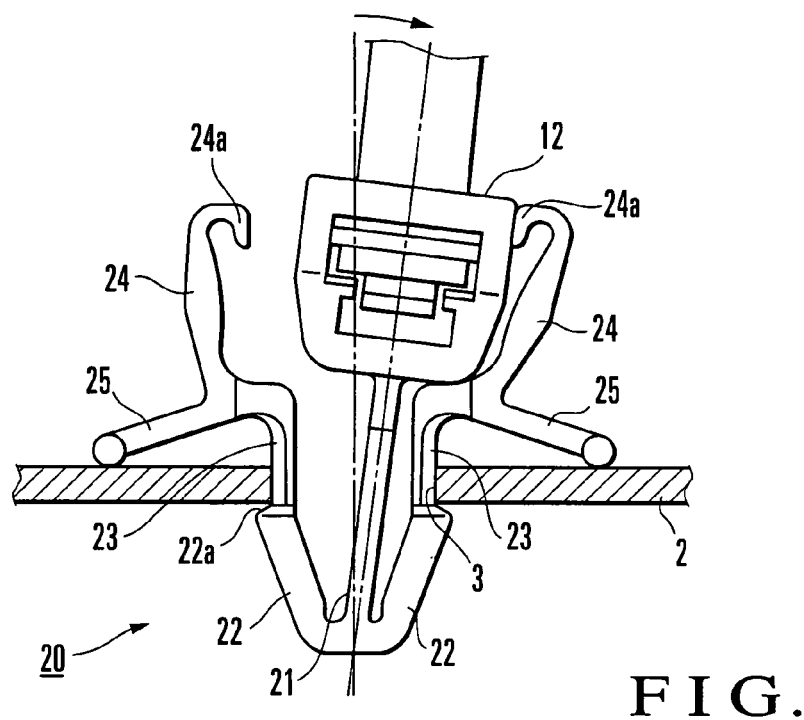
FIG. 6 is a sectional view showing a state wherein an external force is applied to the fitting portion.

With the cable tie 1 being attached, assume that an external force acts on the cable tie 1 through the cables C and the locking portion 12 coupled to the holding portion 10 above the chassis 2, is inclined, as shown in FIG. 6. In this case, as the locking portion 12 and the extending ends 24a of the disengaging pieces 24 are separate, the disengaging pieces 24 will not be pulled by the locking portion 12 and be inclined. Hence, the disengaging pieces 24 will not be inclined inwardly in diameter to impair the fitting state of the fitting pieces 22 and through hole 3. Thus, the cable tie 1 will not drop at its fitting portion 20. When the holding portion 10 is inclined, the locking portion 12 is abutted by the extending end 24a of the disengaging piece 24 on that side in which the locking portion 12 is inclined. This suppresses further inclination of the holding portion 10, and further inclination of the disengaging piece 24.

To remove the cable tie 1 attached in the through hole 3 from the chassis 2, the operator holds the disengaging pieces 24 from the two outer sides with two fingers F, as indicated by alternate long and two short dashed lines in FIG. 4A, and applies a force to the disengaging pieces 24 from the two sides, so that the disengaging pieces 24 deform inwardly. Thus, as shown in FIG. 4A, the connecting pieces 23 integral with the disengaging pieces 24 also deform inwardly, and the fitting pieces 22 integral with the connecting pieces 23 also deform inwardly and reduced in diameter, so that the steps 22a disengage from the inner edge of the through hole 3. The operator then pulls the cable tie 1 upward off the chassis 2, so that the fitting portion 30 can be extracted from the through hole 3, and removal of the cable tie 1 can be realized.

Figure 7:
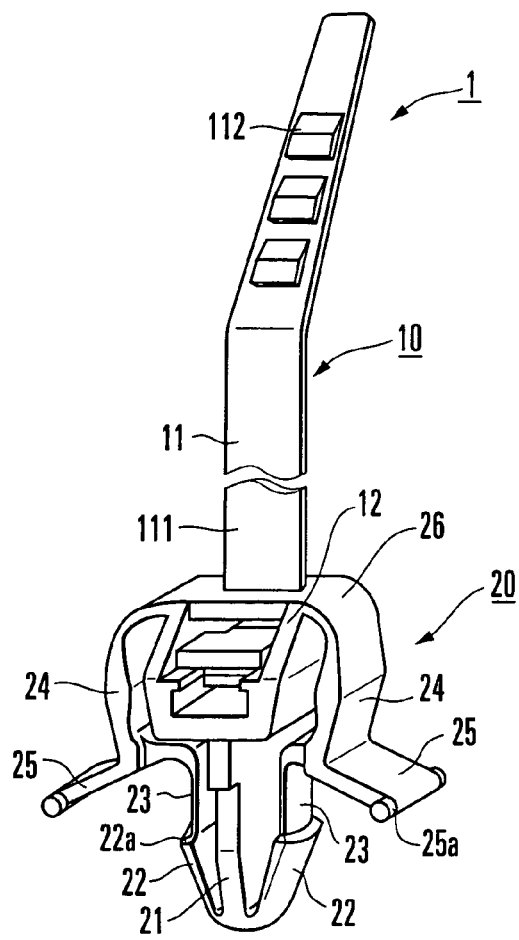
FIG. 7 is a perspective view of the second embodiment of the present invention.
Figure 8:
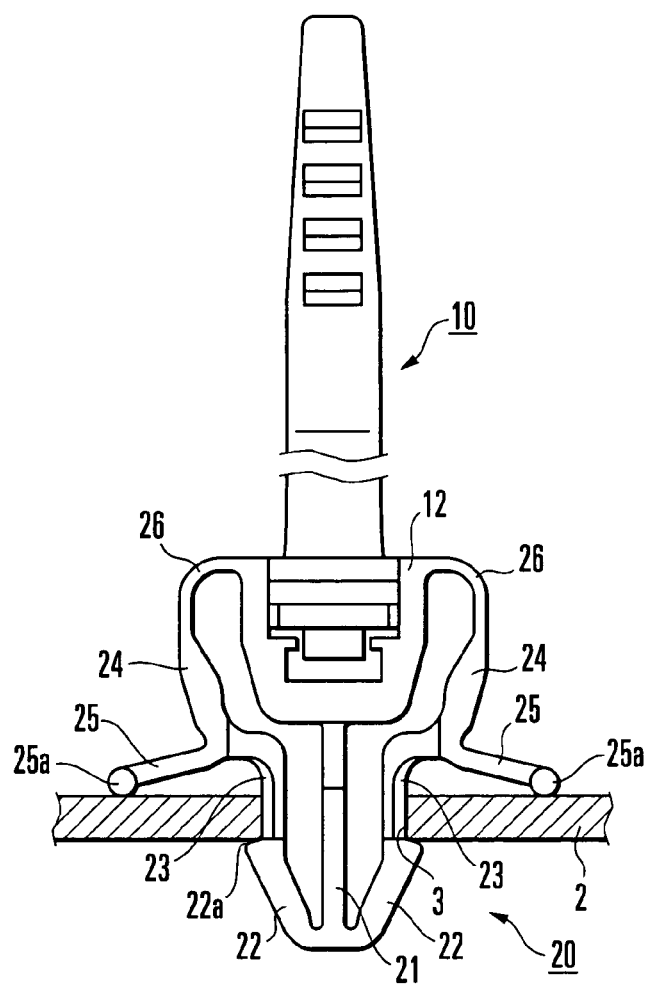
FIG. 8 is a sectional view showing a state wherein a fitting portion of the second embodiment is fitted in a through hole.

FIG. 7 shows the second embodiment in which the present invention is applied to a cable tie 1 similar of that of the first embodiment. The cable tie 1 is formed of a holding portion 10 and fitting portion 20, in the same manner as in the first embodiment. The holding portion 10 and fitting portion 20 are basically the same as those of the first embodiment. The same portions are denoted by the same reference numerals, and a detailed description thereof will be omitted. In the second embodiment, in the fitting portion 20 as shown in FIG. 8, a pair of disengaging pieces 24, connected to the upper ends of a pair of fitting pieces 22 formed in the fitting portion 20 through connecting pieces 23, extend along the two side surfaces of a locking portion 12. The extending ends of the disengaging pieces 24 are connected to the upper shoulders of the two side surfaces of the locking portion 12 through thin easy-to-deform portions 26. As the easy-to-deform portions 26 are thin, they can deform the disengaging pieces 24 relative to the locking portion 12.

With the cable tie 1 of the second embodiment, when attaching the cable tie 1 in a through hole 3 of a chassis 2, the fitting portion 20 of the cable tie 1 is inserted in the through hole 3 from the upper surface side of the chassis 2, in the same manner as in the first embodiment. Then, as shown in FIG. 8, the pair of fitting pieces 22 of the fitting portion 20 are elastically deformed inwardly in diameter and are reduced in diameter. Once the fitting pieces 22 extend through the through hole 3, they restore with their elasticity and enlarge in diameter outwardly, and their steps 22a engage with the inner edge of the through hole 3 on the lower surface side of the chassis 2. Simultaneously, distal ends 25a of a pair of leg pieces 25 elastically abut against the upper surface of the chassis 2, and bias the fitting portion 20 upward. Thus, the steps 22a are pressed against the inner edge of the through hole 3. The fitting portion 20 is fitted in the through hole 3, and will not disengage from it.

In the state wherein the fitting portion 20 is fitted in the through hole 3 in this manner, a stress is generated with which the distal ends 25a of the pair of leg pieces 25 abut against the upper surface of the chassis 2 and deform in the enlarging direction. The pair of disengaging pieces 24 integral with the leg pieces 25 deform in directions to incline inwardly. The extending ends of the disengaging pieces 24 are connected to the locking portion 12 through the easy-to-deform portions 26. Thus, due to the leverage with the disengaging pieces 24 as the fulcrums, a stress is applied to the pair of fitting pieces 22 through the connecting pieces 23 to enlarge them outwardly in diameter. The fitting force of the fitting pieces 22 and through hole 3 increases. The fitting portion 20 will not easily disengage from the through hole 3, and the cable tie 1 will not remove from the chassis 2 easily even with an external force or the like. As the leg pieces 25 deform, even if a chassis 2 having another thickness is used, the chassis 2 is clamped between the fitting pieces 22 in the direction of thickness, so that the reliable fitting state can be held.

Figure 9:
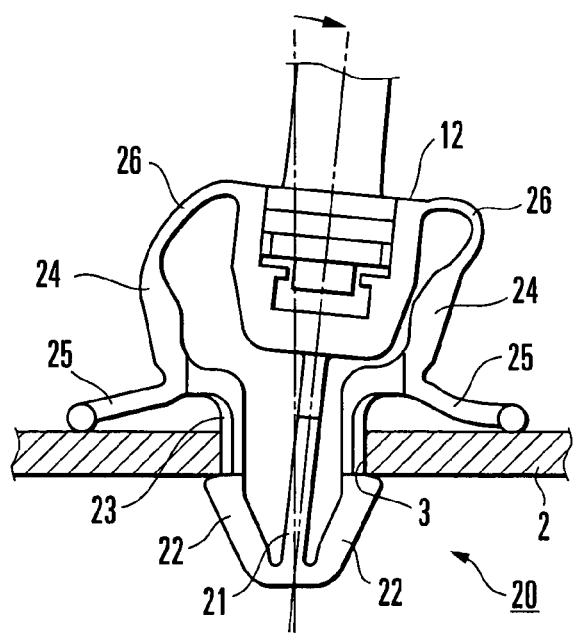
FIG. 9 is a sectional view showing a state wherein an external force is applied to the fitting portion.

As shown in FIG. 9, even if the holding portion 10 is inclined by an external force acting on the cables or the like, on a side opposite to the direction of inclination, the easy-to-deform portion 26 that connects the locking portion 12 and disengaging piece 24 to each other elastically deforms and is elongated. Thus, the inclining force of the locking portion 12 is not easily transmitted to the disengaging piece 24. Hence, even when the locking portion 12 inclines, the corresponding disengaging piece 24 will not be accordingly inclined inwardly in diameter to impair the fitting state of the corresponding fitting piece 22 and through hole 3. Thus, the cable tie 1 will not drop at its fitting portion 20. On the inclining side, the inclination of the locking portion 12 is transmitted to the corresponding disengaging piece 24 through the easy-to-deform portion 26. This suppresses inclination of the locking portion 12 through the easy-to-deform portion 26, and further inclination of the holding portion 10.

To disengage the cable tie 1 attached in the through hole 3 of the chassis 2 from the chassis 2, the operator holds the disengaging pieces 24 from two outer sides with his or her two fingers, in the same manner as in the first embodiment. The operator applies a force from the two sides to deform the disengaging pieces 24 inwardly. The fitting pieces 22 deform inwardly through the connecting pieces 23, and are reduced in diameter. Thus, the steps 22a disengage from the inner edge of the through hole 3. As a result, the fitting pieces 22 can be extracted from the through hole 3, and the cable tie 1 can be removed.

Figure 10:
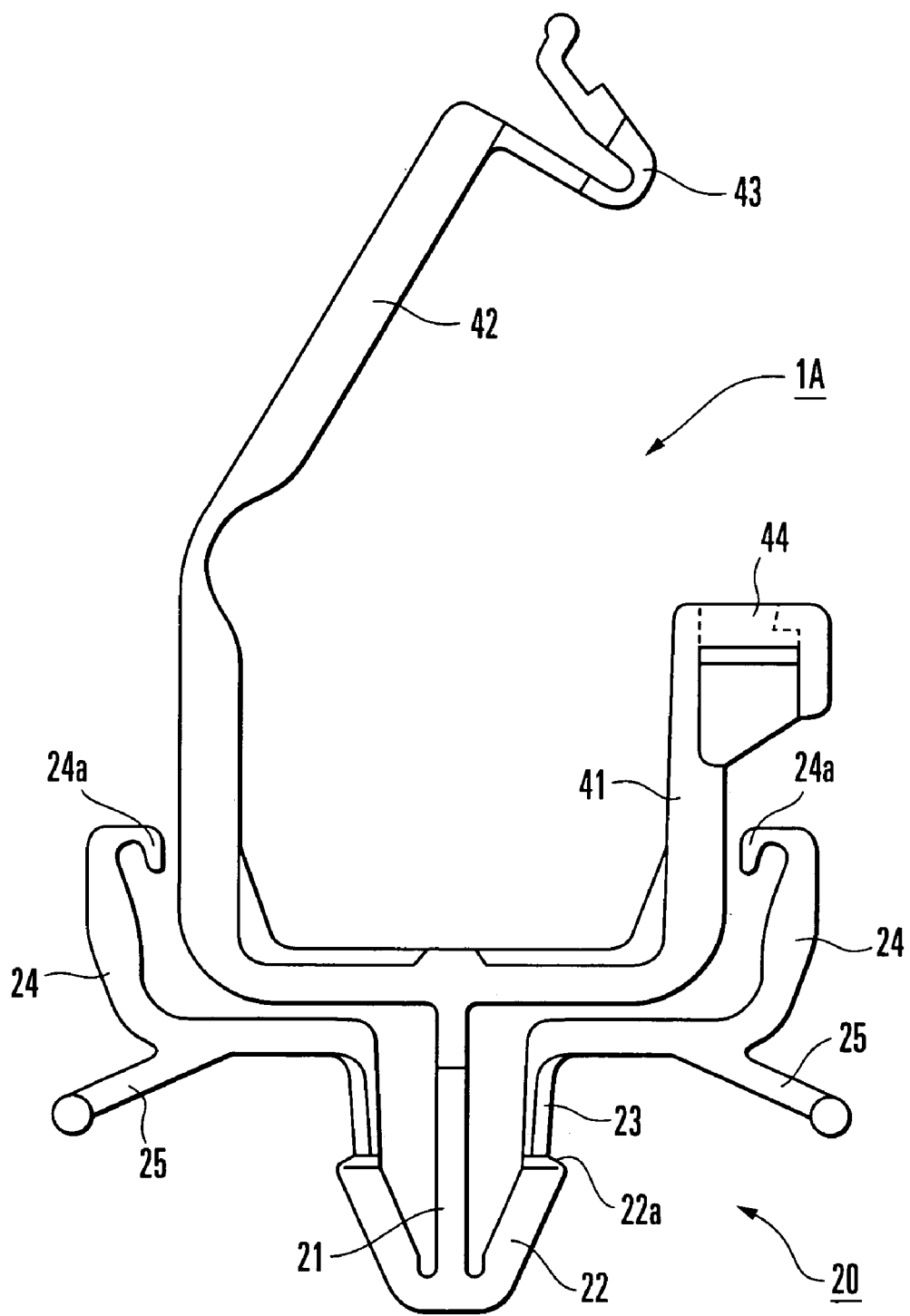
FIG. 10 is a front view of an embodiment in which the present invention is applied to a wire saddle.

In this embodiment, the present invention is applied to a cable tie. The present invention can also be applied to other fixing tools having holding portions with different arrangements. For example, when the fitting portion of the first embodiment of the present invention is to be applied to another fixing tool, it can be applied to a locking wire saddle 1A as shown in FIG. 10. In the locking wire saddle 1A, a locking piece 43 is formed at the distal end of a stopper piece 42 that can open and close the opening of a saddle main body 41 which forms a U-shape upward. A saddle portion 40 can lock the locking piece 43 with respect to a locking portion 44 formed on the saddle main body 41. Thus, cables are less likely to disengage. In this case, extending ends 24a of a pair of disengaging pieces 24 of a fitting portion 20 may be disposed such that they oppose each other at a required gap along the two side surfaces of the saddle main body 41.

Figure 11:
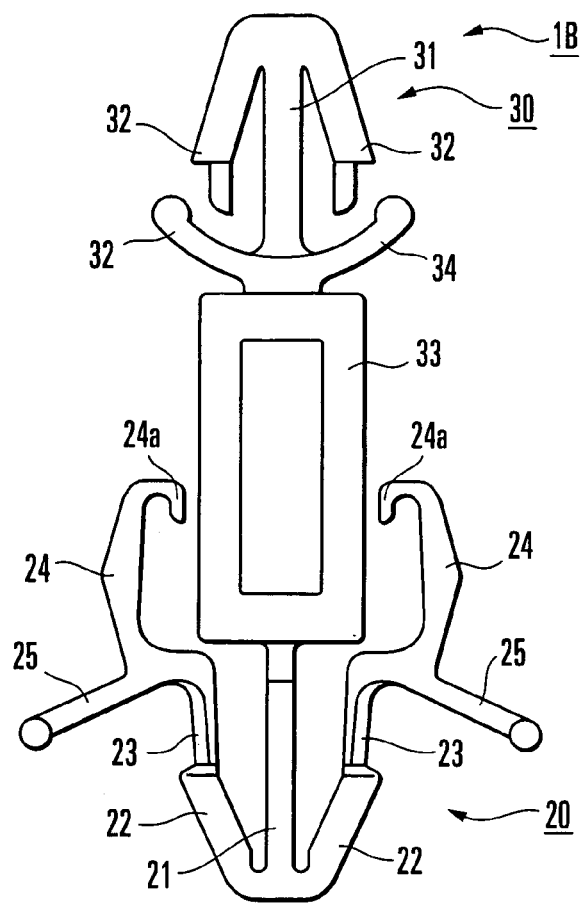
FIG. 11 is a front view of an embodiment in which the present invention is applied to a board holding tool.
Figure 12:
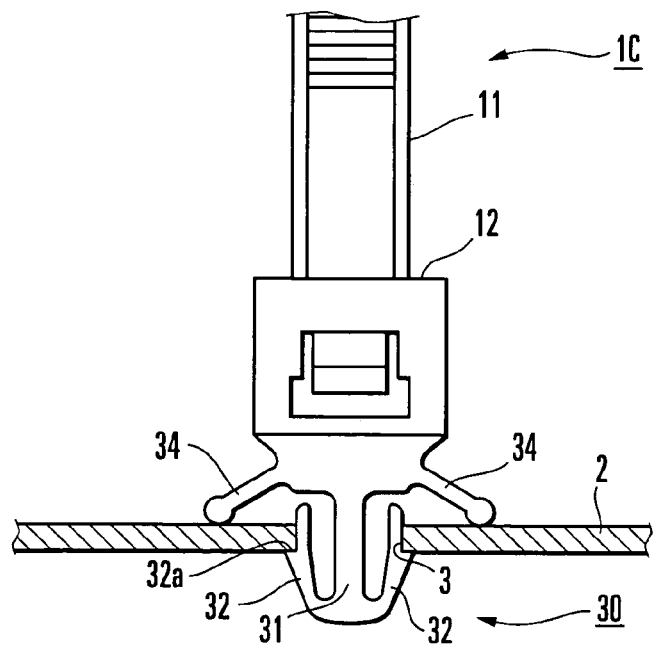
FIG. 12 is a sectional view of part of a conventional cable tie.

Alternatively, the present invention can also be applied to a board holding tool as shown in FIG. 11. This board holding tool has, as its holding portion, an upper end fitting portion 30 formed of fitting pieces 32 and leg pieces 34, as shown in FIG. 12, and holds a printed circuit board with the upper end fitting portion 30. More specifically, a body 33 is integrally formed with a post 21 of the fitting portion 20. A post 31 projects upward from the upper end of the body 33. A pair of fitting pieces 32 are formed on the post 31 to project downward. The pair of leg pieces 34 are formed on the lower side of the post 31. With this fitting portion 30, the fitting pieces 32 are fitted in a through hole formed in a printed circuit board (not shown). The printed circuit board is clamped between the fitting pieces 32 and leg pieces 34. Thus, the printed circuit board can be held above the body 33.

Although not shown, the fixing tool of the present invention can also be similarly applied to various types of fixing tools, each of which is attached to a chassis by fitting its fitting portion in a through hole formed in the chassis, so that various types of components are held by its holding portion.

As has been described above, with the fixing tool of the present invention, the pair of disengaging pieces provided to the fitting portion are held with the fingers from the two outer sides, and the fitting pieces are elastically deformed inwardly in diameter. Thus, the fixing tool can be removed from the through hole in the chassis easily. When the fitting portion is fitted in the through hole, the projecting distal ends of the pair of disengaging pieces are abutted by the holding portion, or are connected to it. Due to the leverage of the disengaging pieces, a force is applied to the fitting pieces linked to the disengaging pieces to enlarge them in diameter. Thus, the fixing tool is prevented from dropping from the through hole. When the holding portion is inclined, the stress acting on the holding portion will not be transmitted to the fitting pieces, or transmission of the stress becomes difficult. Thus, the fitting pieces will not be reduced in diameter to disengage from the through hole. As a result, a fixing tool that can be attached on and disengaged from the chassis easily and will not easily drop from the chassis can be obtained.

What is claimed is:

1. A fixing tool comprising:
   a holding portion which allows a chassis to hold a component; and
   a fitting portion which is connected with said holding portion and is to be fitted in a through hole formed in the chassis to fix said holding portion to the chassis, wherein said fitting portion comprises
   a post projecting downward from said holding portion,
   a pair of fitting pieces having proximal ends which are connected with a distal end of said post to have an arrowhead shape and elastically deform outwardly in diameter so as to be fitted in the through hole,
   a pair of connecting pieces connected with distal ends of the fitting pieces forming steps at the distal ends of the fitting pieces,
   a pair of disengaging pieces which are connected with the connecting pieces and extend in a first direction away from the connecting pieces, and
   a pair of leg pieces which have proximal ends connected with said connecting pieces and extend in a second direction different from said first direction and which is inclined downward towards the distal end of said post and away from the fitting pieces such that the distal ends of the leg pieces are able to abut against an upper surface of the chassis.

* * * * *